United States Patent
Lee et al.

(10) Patent No.: US 12,167,157 B2
(45) Date of Patent: Dec. 10, 2024

(54) IMAGE SENSOR AND OPERATING METHOD THEREOF

(71) Applicant: SK hynix Inc., Gyeonggi-do (KR)

(72) Inventors: Sun Young Lee, Gyeonggi-do (KR);
Jeong Eun Song, Gyeonggi-do (KR);
Min Seok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 50 days.

(21) Appl. No.: 18/088,622

(22) Filed: Dec. 26, 2022

(65) Prior Publication Data

US 2023/0412948 A1    Dec. 21, 2023

(30) Foreign Application Priority Data

Jun. 17, 2022    (KR) .......................... 10-2022-0074320

(51) Int. Cl.
*H04N 25/76* (2023.01)
*G01S 17/89* (2020.01)
*H04N 25/705* (2023.01)

(52) U.S. Cl.
CPC ......... *H04N 25/7795* (2023.01); *G01S 17/89* (2013.01); *H04N 25/705* (2023.01)

(58) Field of Classification Search
CPC ............. H04N 25/7795; H04N 25/705; H04N 25/745; H04N 25/771; G01S 17/89; G01S 17/894
USPC ........................................................ 348/135
See application file for complete search history.

(56) References Cited

U.S. PATENT DOCUMENTS

| | | | |
|---|---|---|---|
| 10,003,479 B2 | 6/2018 | Thakkar et al. | |
| 11,923,860 B2 * | 3/2024 | Tsuji | H03L 7/0995 |
| 2009/0051396 A1 * | 2/2009 | Shimamoto | H03K 5/135 |
| | | | 324/76.62 |
| 2014/0002170 A1 * | 1/2014 | Miyanishi | H04N 1/047 |
| | | | 327/299 |
| 2014/0204697 A1 * | 7/2014 | Kim | H03L 7/0812 |
| | | | 365/233.12 |
| 2021/0190955 A1 * | 6/2021 | Otani | H04N 25/75 |
| 2022/0107421 A1 * | 4/2022 | Kim | G01S 7/4865 |
| 2022/0302919 A1 * | 9/2022 | Tsuji | H03L 7/0991 |

OTHER PUBLICATIONS

Min-Sun Keel et al., A 640×480 Indirect Time-of-Flight CMOS Image Sensor with 4-tap 7-µm Global-Shutter Pixel and Fixed-Pattern Phase Noise Self-Compensation Scheme, 2019 Symposium on VLSI Circuits Digest of Technical Papers, Jun. 9-14, 2019, pp. C258-C259, IEEE, U.S.A.

\* cited by examiner

*Primary Examiner* — Tung T Vo
(74) *Attorney, Agent, or Firm* — IP & T GROUP LLP

(57) ABSTRACT

Disclosed is an image sensor including a plurality of selection circuits each suitable for receiving two clock signals among an input clock signal and a plurality of delayed clock signals, and outputting, as each of a plurality of selection clock signals, one selection clock signal between the two clock signals on the basis of a control signal; and a plurality of buffer circuits suitable for generating the plurality of delayed clock signals on the basis of the plurality of selection clock signals outputted from the plurality of selection circuits.

18 Claims, 9 Drawing Sheets

IMAGE SENSOR AND OPERATING METHOD THEREOF

CROSS-REFERENCE TO RELATED APPLICATION(S)

This application claims priority under 35 U.S.C. § 119 to Korean Patent Application No. 10-2022-0074320, filed on Jun. 17, 2022, the disclosure of which is incorporated herein by reference in its entirety.

BACKGROUND

1. Field

Various embodiments of the present disclosure relate to a semiconductor design technique, and more particularly, to an image sensor and an operating method thereof.

2. Description of the Related Art

Image sensors are sensors for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors allow both analog and digital control circuits to be directly implemented on a single integrated circuit (IC).

SUMMARY

Various embodiments of the present disclosure are directed to an image sensor that may stably generate dock signals used when measuring a depth.

In accordance with an embodiment of the present disclosure, an image sensor may include: a plurality of selection circuits each suitable for receiving two dock signals among an input clock signal and a plurality of delayed dock signals, and outputting, as each of a plurality of selection dock signals, one selection dock signal between the two dock signals on the basis of a control signal; and a plurality of buffer circuits suitable for generating the plurality of delayed dock signals on the basis of the plurality of selection clock signals outputted from the plurality of selection circuits.

In accordance with an embodiment of the present disclosure, an image sensor may include: a first selection circuit suitable for receiving a first input clock signal and a second delayed dock signal, and outputting, as a first selection dock signal, one of the first input dock signal and the second delayed clock signal on the basis of a control signal; a first buffer circuit suitable for generating a first delayed clock signal on the basis of the first selection clock signal; a second selection circuit suitable for receiving the first delayed clock signal and a third delayed clock signal, and outputting, as a second selection clock signal, one of the first delayed clock signal and the third delayed clock signal on the basis of the control signal; a second buffer circuit suitable for generating the second delayed clock signal on the basis of the second selection dock signal; a third selection circuit suitable for receiving the second delayed clock signal and the first input dock signal, and outputting, as a third selection clock signal, one of the second delayed dock signal and the first input clock signal on the basis of the control signal; and a third buffer circuit suitable for generating the third delayed clock signal on the basis of the third selection dock signal.

In accordance with an embodiment of the present disclosure, an operating method of an image sensor may include: sequentially generating a plurality of delayed dock signals from a first one to a last one of the delayed dock signals along a forward path of a dock chain on the basis of a control signal during a first exposure period included in a first phase, while keeping the control signal to a first logic level during the first exposure period; and sequentially generating the plurality of delayed dock signals from the last one to the first one of the delayed dock signals along a backward path of the dock chain on the basis of the control signal during a second exposure period included in a second phase, while keeping the control signal to a second logic level during the second exposure period.

In accordance with an embodiment of the present disclosure, an image sensor for generating depth map information according to a time of flight (TOF) scheme, the image sensor may include: a pixel array configured to generate, from an incident light, pixel signals for the depth information according to a group of output clock signals during first and second exposure periods; a controller configured to generate the group based on a forward sequence of delayed dock signals during the first exposure period and based on a backward sequence of the delayed dock signals during the second exposure period, wherein the controller includes a chain of delay units, two at both ends of which are configured to selectively receive an input dock signal, and wherein the controller is further configured to: sequentially generate, based on the input dock signal provided through one of the ends, the forward sequence from a first one to a last one of the delayed docks signals, and sequentially generate, based on the input dock signal provided through the other one of the ends, the backward sequence from the last one to first one of the delayed docks signals.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
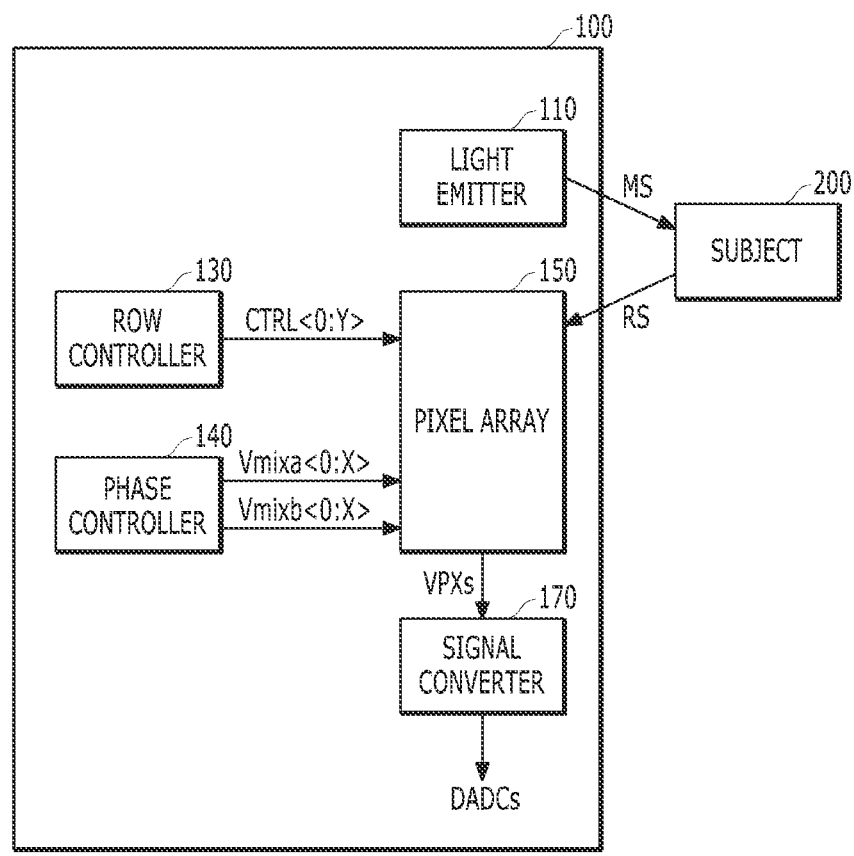
FIG. 1 is a block diagram illustrating an image sensor in accordance with an embodiment of the present disclosure.

FIG. 1 is a block diagram illustrating an image sensor 100 in accordance with an embodiment of the present disclosure.

Referring to FIG. 1, the image sensor 100 may generate depth map information indicating a depth from a subject 200 by using a time of flight (TOF) method. For example, the image sensor 100 may generate or calculate the depth map information by detecting a phase difference between emitted light MS that is emitted to the subject 200 and incident light RS that is reflected from the subject 200. For example, the image sensor 100 may include a light emitter 110, a row controller 130, a phase controller 140, a pixel array 150, and a signal converter 170.

The light emitter 110 may output the emitted light MS to the subject 200. For example, the emitted light MS may be a periodic signal that periodically toggles.

The row controller 130 may generate a plurality of row control signals CTRL<0:Y> for controlling the pixel array 150 for each row, Herein, "Y" may correspond to the number of rows of the pixel array 150, For example, the row controller 130 may generate first row control signals CTRL<0> for controlling pixels arranged in a first row of the pixel array 150, and generate (Y+1)th row control signals CTRL<Y> for controlling pixels arranged in a (Y+1)th row of the pixel array 150.

The phase controller 140 may generate a plurality of first output dock signals Vmixa<0:X> and a plurality of second output dock signals Vmixb<0:X>. Herein, "X" may correspond to the number of columns of the pixel array 150. The first output dock signals Vmixa<0:X> may have the same phase, the second output dock signals Vmixb<0:X> may have the same phase, and the first output dock signals Vmixa<0:X> and the second output clock signals Vmixb<0:X> may have different phases. For example, the first output dock signals Vmixa<0:X> and the second output dock signals Vmixb<0:X> may have a phase difference of 180 degrees.

The pixel array 150 may generate a plurality of pixel signals VPXs on the basis of the incident light RS, the row control signals CTRL<0:Y>, the first output dock signals Vmixa<0:X> and the second output dock signals Vmixb<0:X>. The pixel array 150 may include a plurality of unit pixels for measuring the depth from the subject 200. The plurality of unit pixels may be arranged in row and column directions. Each of the unit pixels may generate first and second pixel signals on the basis of a corresponding row control signal CTRL<#>, a corresponding first output dock signal Vmixa<#>, a corresponding second output clock signal Vmixb<#> and the incident light RS (refer to FIG. 2).

The signal converter 170 may generate a plurality of digital signals DADCs corresponding to the depth map information, on the basis of the plurality of pixel signals VPXs. For example, the signal converter 170 may include an analog-to-digital converter (ADC).

Although not illustrated in the drawing, the depth map information may be substantially generated by an image processor. The image processor may generate the depth map information indicating the depth from the subject 200, on the basis of the plurality of digital signals DADCs. For example, the image processor may generate or calculate the depth map information by performing a subtraction process on first and second digital signals corresponding to the first and second pixel signals generated from each of the unit pixels.

Figure 2:
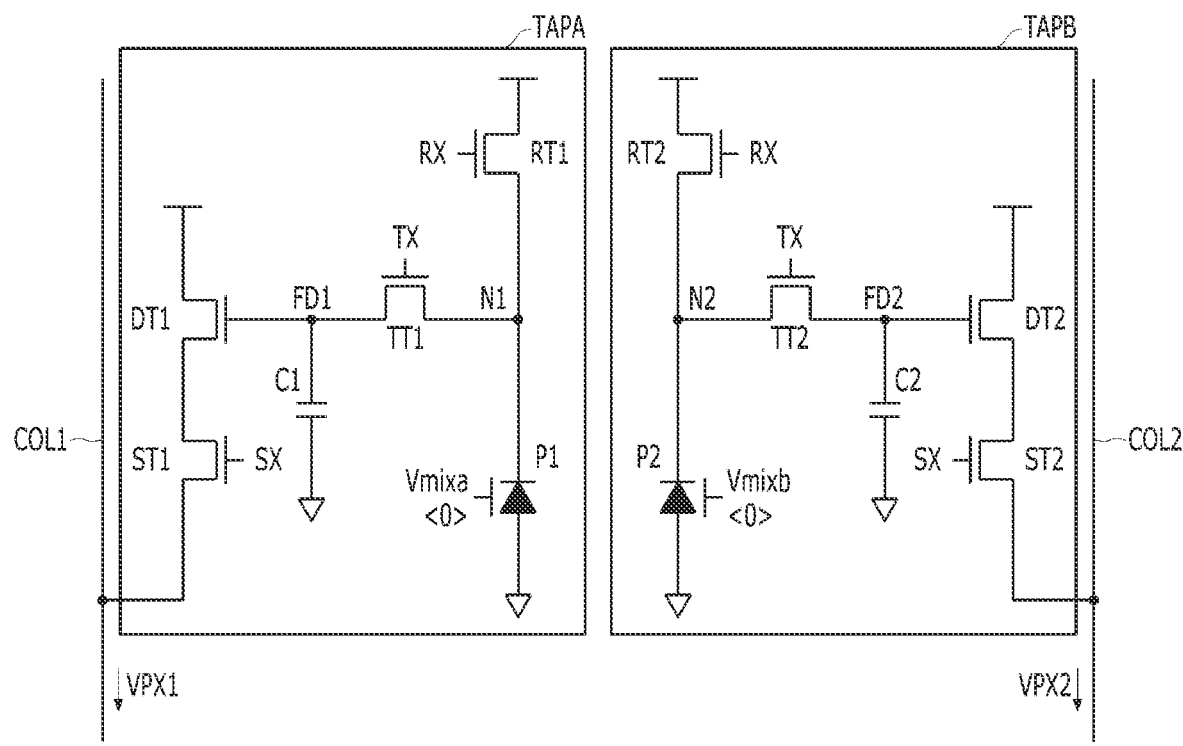
FIG. 2 is a circuit diagram illustrating a portion of a pixel array illustrated in FIG. 1 in accordance with an embodiment of the present disclosure.

FIG. 2 is a circuit diagram illustrating a portion of the pixel array 150 illustrated in FIG. 1 in accordance with an embodiment of the present disclosure. That is, a circuit diagram of the unit pixel is illustrated in FIG. 2.

Referring to FIG. 2, the unit pixel may include a pair of pixels. For example, the pair of pixels may include a first pixel TAPA and a second pixel TAPE.

The first pixel TAPA may generate a first pixel signal VPX1 on the basis of a reset signal RX, a transmission signal TX, a selection signal SX and the first output clock signal Vmixa<0>. The reset signal RX, the transmission signal TX and the selection signal SX may be included in any row control signal CTRL<#> of the plurality of row control signals CTRL<0:Y> described above. For example, the first pixel TAPA may include a first sensing circuit P1, a first reset circuit RT1, a first transmission circuit 111, a first charge storage circuit C1, a first driving circuit DT1 and a first selection circuit ST1.

The first sensing circuit P1 may be coupled between a first node N1 and a first low voltage terminal. The first sensing circuit P1 may generate first charges, which correspond to the incident light RS, on the basis of the first output clock signal Vmixa<0>. The first sensing circuit P1 may include a photodiode.

The first reset circuit RT1 may be coupled between a first high voltage terminal and the first node N1. The first reset circuit RT1 may reset the first sensing circuit P1 and the first charge storage circuit C1 on the basis of the reset signal RX.

The first transmission circuit TT1 may be coupled between the first node N1 and a first floating diffusion node FD1. The first transmission circuit 1 may reset the first charge storage circuit C1 and transmit the first charges, which are generated from the first sensing circuit P1, to the first charge storage circuit C1, on the basis of the transmission signal TX.

The first charge storage circuit C1 may be coupled between the first floating diffusion node FD1 and the first low voltage terminal. The first charge storage circuit C1 may store the first charges. For example, the first charge storage circuit C1 may be a parasitic capacitor.

The first driving circuit DT1 may be coupled between the first high voltage terminal and the first selection circuit ST1. The first driving circuit DT1 may drive a first column line COLA with a high voltage, which is supplied through the first high voltage terminal, on the basis of a voltage loaded on the first floating diffusion node FD1.

The first selection circuit ST1 may be coupled between the first driving circuit DT1 and the first column line COL1. The first selection circuit ST1 may selectively couple the first driving circuit DT1 to the first column line COL1 on the basis of the selection signal SX. The first selection circuit ST1 may output the first pixel signal VPX1 through the first column line COL1.

The second pixel TAPB may generate a second pixel signal VPX2 on the basis of a reset signal RX, a transmission signal TX, a selection signal SX and the second output clock signal Vmixb<0>, For example, the second pixel TAPB may include a second sensing circuit P2, a second reset circuit RT2, a second transmission circuit TT2, a second charge storage circuit C2, a second driving circuit DT2 and a second selection circuit ST2.

The second sensing circuit P2 may be coupled between a second node N2 and the first low voltage terminal. The second sensing circuit P2 may generate second charges, which correspond to the incident light RS, on the basis of the second output clock signal Vmixb<0>, The second sensing circuit P2 may include a photodiode.

The second reset circuit RT2 may be coupled between the first high voltage terminal and the second node N2, The second reset circuit RT2 may reset the second sensing circuit P2 and the second charge storage circuit C2 on the basis of the reset signal RX.

The second transmission circuit TT2 may be coupled between the second node N2 and a second floating diffusion node FD2. The second transmission circuit TT2 may reset the second charge storage circuit C2 and transmit the second charges, which are generated from the second sensing circuit P2, to the second charge storage circuit C2, on the basis of the transmission signal TX.

The second charge storage circuit C2 may be coupled between the second floating diffusion node FD2 and the first low voltage terminal. The second charge storage circuit C2 may be a parasitic capacitor.

The second driving circuit DT2 may be coupled between the first high voltage terminal and the second selection circuit ST2. The second driving circuit DT2 may drive a second column line COL2 with the high voltage, which is supplied through the first high voltage terminal, on the basis of a voltage loaded on the second floating diffusion node FD2.

The second selection circuit ST2 may be coupled between the second driving circuit DT2 and the second column line COL2. The second selection circuit ST2 may selectively couple the second driving circuit DT2 to the second column line COL2 on the basis of the selection signal SX. The second selection circuit ST2 may output the second pixel signal VPX2 through the second column line COL2.

Figure 3:
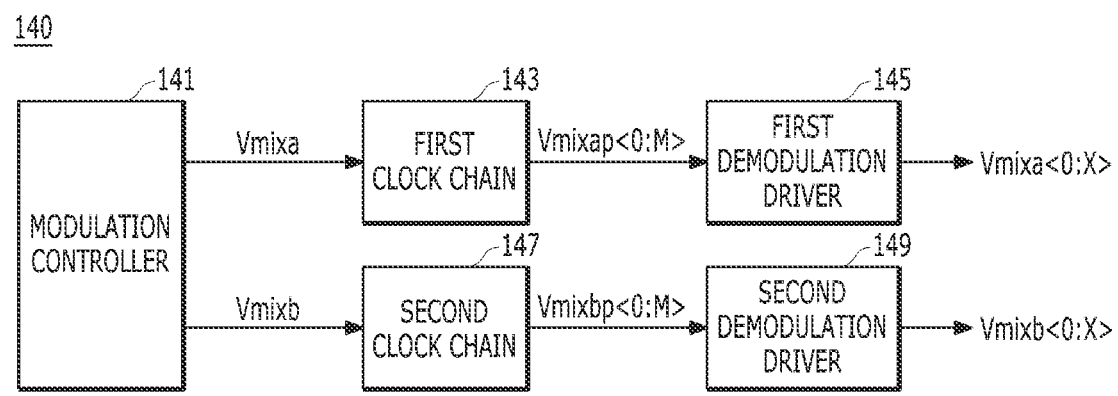
FIG. 3 is a block diagram illustrating an example of a phase controller illustrated in FIG. 1 in accordance with an embodiment of the present disclosure.

FIG. 3 is a block diagram illustrating an example of the phase controller 140 illustrated in FIG. 1 in accordance with an embodiment of the present disclosure.

Referring to FIG. 3, the phase controller 140 may include a modulation controller 141, a first dock chain 143, a first demodulation driver 145, a second dock chain 147 and a second demodulation driver 149.

The modulation controller 141 may generate first and second input dock signals Vmixa and Vmixb having different phases. For example, the first and second input dock signals Vmixa and Vmixb may have a phase difference of 180 degrees.

The first dock chain 143 may receive the first input dock signal Vmixa, and generate a plurality of first delayed clock signals Vmixap<0:M>, where "M" is a natural number equal to or greater than 1. For example, the first clock chain 143 may generate the plurality of first delayed clock signals Vmixap<0:M> that are sequentially activated and sequentially deactivated.

The first demodulation driver 145 may receive the first delayed clock signals Vmixap<0:M>, and generate the plurality of first output clock signals Vmixa<0:X>, where "X" is a natural number greater than "M".

The second clock chain 147 may receive the second input clock signal Vmixb, and generate a plurality of second delayed clock signals Vmixbp<0:M>, For example, the second clock chain 147 may generate the plurality of second delayed clock signals Vmixbp<0:M> that are sequentially activated and sequentially deactivated.

The second demodulation driver 149 may receive the second delayed clock signals Vmixbp<0:M>, and generate the plurality of second output clock signals Vmixb<0:X>.

Since the first and second clock chains 143 and 147 may be designed in the same manner, and the first and second demodulation drivers 145 and 149 may also be designed in the same manner, the first clock chain 143 and the first demodulation driver 145 are representatively described below.

Figure 4:
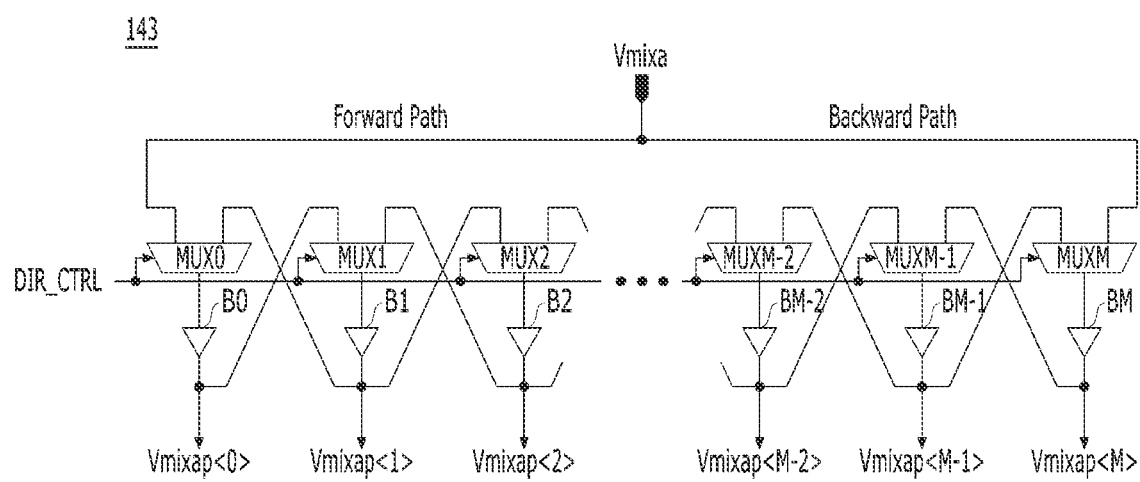
FIG. 4 is a block diagram illustrating an example of a first clock chain illustrated in FIG. 3 in accordance with an embodiment of the present disclosure.

FIG. 4 is a block diagram illustrating the first clock chain 143 illustrated in FIG. 3 in accordance with an embodiment of the present disclosure.

Referring to FIG. 4, the first clock chain 143 may include a plurality of selection circuits MUX© to MUXM and a plurality of buffer circuits B0 to BM.

The plurality of selection circuits MUX0 to MUXM may each receive two clock signals among the plurality of first delayed clock signals Vmixap<0:M> and the first input clock signal Vmixa, and each output one of the two clock signals as a selection clock signal on the basis of a control signal DIR_CTRL. When "M" is 2, the plurality of selection circuits MUX0 to MUXM may be described as first to third selection circuits MUX0 to MUX2. The first selection circuit MUX0 disposed at one end of the first to third selection circuits MUX0 to MUX2 may receive the first input clock signal Vmixa and the second delayed dock signal Vmixap<1>, and output one of the first input clock signal Vmixa and the second delayed clock signal Vmixap<1> as a first selection clock signal on the basis of the control signal DIR_CTRL. Herein, the first input clock signal Vmixa may be inputted to the first selection circuit MUX0 through a forward path of the first clock chain 143. The third selection circuit MUX2 disposed at the other end of the first to third selection circuits MUX0 to MUX2 may receive the first input clock signal Vmixa and the second delayed clock signal Vmixap<1>, and output one of the first input clock signal Vmixa and the second delayed clock signal Vmixap<1> as a third selection clock signal on the basis of the control signal DIR_CTRL. Herein, the first input clock signal Vmixa may be inputted to the third selection circuit MUX2 through a backward path of the first clock chain 143. The second selection circuit MUX1 disposed between the one end and the other end of the first to third selection circuits MUX0 to MUX2 may receive the first delayed clock signal Vmixap<0> and the third delayed clock signal Vmixap<2>, and output one of the first delayed clock signal Vmixap<0> and the third delayed clock signal Vmixap<2> as a second selection clock signal on the basis of the control signal DIR_CTRL.

The plurality of buffer circuits B0 to BM may be coupled to output terminals of the plurality of selection circuits MUX0 to MUXM, respectively. The plurality of buffer circuits B0 to BM may generate the plurality of delayed dock signals Vmixap<0:M>, respectively, on the basis of the plurality of selection dock signals outputted from the plurality of selection circuits MUX0 to MUXM. When "M" is 2, the plurality of buffer circuits B0 to BM may be described as first to third buffer circuits B0 to B2. The first buffer circuit B0 coupled to the output terminal of the first selection circuit MUX0 among the first to third buffer circuits B0 to BM may delay the first selection clock signal by a predetermined delay time, and generate the first delayed clock signal Vmixap<0>. The second buffer circuit 31 coupled to the output terminal of the second selection circuit MUX1 among the first to third buffer circuits B0 to BM may delay the second selection clock signal by the delay time, and generate the second delayed clock signal Vmixap<1>, The third buffer circuit B2 coupled to the output terminal of the third selection circuit MUX2 among the first to third buffer circuits B0 to BM may delay the third selection clock signal by the delay time, and generate the third delayed clock signal Vmixap<2>.

The plurality of buffer circuits B0 to BM may sequentially generate the plurality of delayed clock signals Vmixap<0:M> from the first one Vmixap<0> to the last one Vmixap<M> of the delayed clock signals Vmixap<0:11> along the forward path, during a first exposure period EP1 included in a first phase PHS1. The plurality of buffer circuits B0 to BM may sequentially generate the plurality of delayed dock signals Vmixap<0:M> from the last one Vmixap<M> to the first one Vmixap<0> of the delayed clock signals Vmixap<0:M> along the backward path, during a second exposure period EP2 included in a second phase PHS2.

Figure 5:
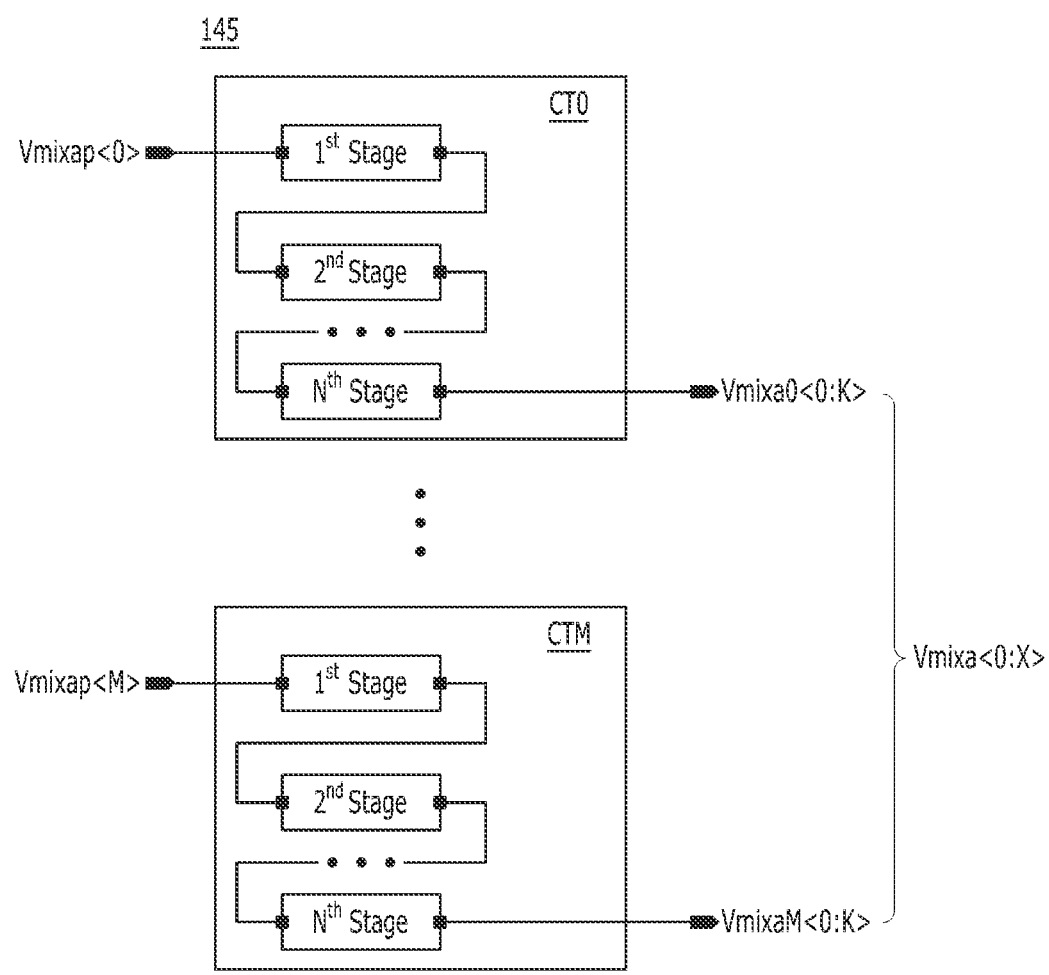
FIG. 5 is a block diagram illustrating an example of a first demodulation driver illustrated in FIG. 3 in accordance with an embodiment of the present disclosure.

FIG. 5 is a block diagram illustrating the first demodulation driver 145 illustrated in FIG. 3 in accordance with an embodiment of the present disclosure.

Referring to FIG. 5, the first demodulation driver 145 may include a plurality of clock trees CT0 to CTM. The plurality of clock trees CT0 to CTM may be configured to correspond to the plurality of delayed clock signals Vmixap<0:M>, respectively. The plurality of clock trees CT0 to CTM may distribute the plurality of delayed clock signals Vmixap<0:M>, respectively, and generate the plurality of first output clock signals Vmixa<0:X>. When "M" is 2, the plurality of clock trees CT0 to CTM may be described as first to third clock trees CT0 to CT2. The first clock tree CT0 may receive the first delayed clock signal Vmixap<0>, distribute the first delayed clock signal Vmixap<0>, and generate a plurality of first clock signals Vmixa0<0:K>, where "K" is a natural number equal to or greater than 1, The second clock tree CT1 may receive the second delayed clock signal Vmixap<1>, distribute the second delayed clock signal Vmixap<1>, and generate a plurality of second clock signals Vmixa1<0:1>. The third clock tree CT2 may receive the third delayed clock signal Vmixap<2>, distribute the third delayed clock signal Vmixap<2>, and generate a plurality of third clock signals Vmixa2<0:K>, The plurality of first clock signals Vmixa0<0:K>, the plurality of second clock signals Vmixa1<0:K>, and the plurality of third clock signals Vmixa2<0:K> may be included in the plurality of first output clock signals Vmixa<0; X>.

Each of the plurality of clock trees CT0 to CTM may include a plurality of stages $1^{st}$ stage to $N^{th}$ stage.

Figure 6:
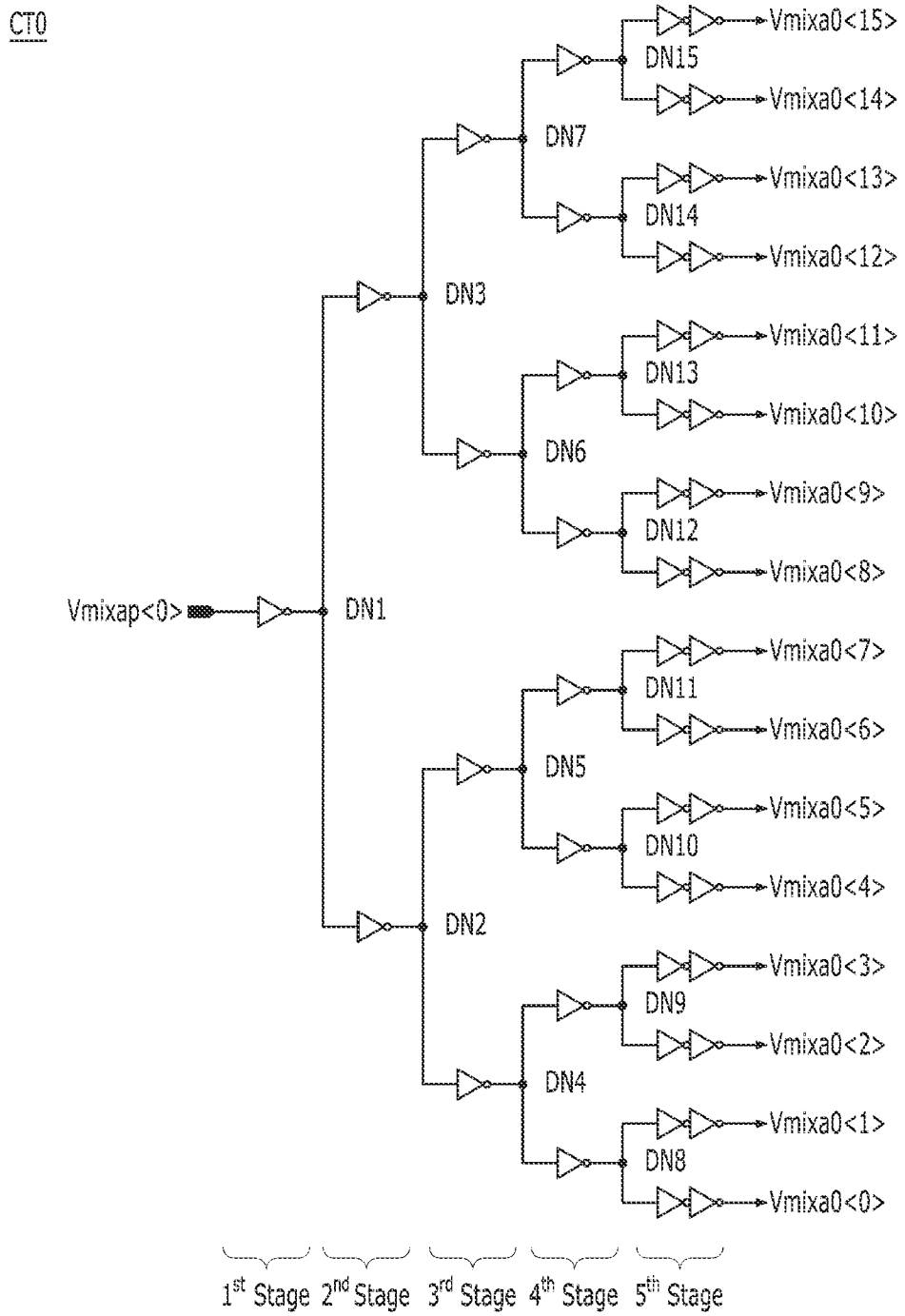
FIG. 6 is a circuit diagram illustrating an example of a first clock tree illustrated in FIG. 5 in accordance with an embodiment of the present disclosure.

FIG. 6 is a circuit diagram illustrating an example of the first clock tree CT0 illustrated in FIG. 5 in accordance with an embodiment of the present disclosure.

Referring to FIG. 6, the first stage $1^{st}$ stage may distribute or divide first and second distribution clock signals corresponding to the first delayed clock signal Vmixap<0> through a first distribution terminal DN1, For example, the first stage $1^{st}$ stage may include a first inverter coupled between an input terminal of the first delayed clock signal Vmixap<0> and the first distribution terminal DN1.

The second stage $2^{nd}$ stage may distribute third and fourth distribution clock signals corresponding to the first distribution clock signal through a second distribution terminal DN2, and distribute fifth and sixth distribution clock signals corresponding to the second distribution clock signal through a third distribution terminal DN3. For example, the second stage $2^{nd}$ stage may include a second inverter coupled between the first distribution terminal DN1 and the second distribution terminal DN2, and a third inverter coupled between the first distribution terminal DN1 and the third distribution terminal DN3.

The third stage $3^{rd}$ stage may distribute seventh and eighth distribution clock signals corresponding to the third distribution clock signal through a fourth distribution terminal DN4, distribute ninth and distribution clock signals corresponding to the fourth distribution clock signal through a fifth distribution terminal DN5, and distribute $11^{th}$ and $12^{th}$ distribution clock signals corresponding to the fifth distribution clock signal through a sixth distribution terminal DN6, and distribute $13^{th}$ and $14^{th}$ distribution clock signals corresponding to the sixth distribution clock signal through a seventh distribution terminal DN7. For example, the third stage $3^{rd}$ stage may include a fourth inverter coupled between the second distribution terminal DN2 and the fourth distribution terminal DN4, a fifth inverter coupled between the second distribution terminal DN2 and the fifth distribution terminal DN5, a sixth inverter coupled between the third distribution terminal DN3 and the sixth distribution terminal DN6, and a seventh inverter coupled between the third distribution terminal DN3 and the seventh distribution terminal DN7.

The fourth stage $4^{th}$ stage may distribute $15^{th}$ and $16^{th}$ distribution clock signals corresponding to the seventh distribution clock signal through an eighth distribution terminal DN8, distribute $17^{th}$ and $18^{th}$ distribution clock signals corresponding to the eighth distribution clock signal through a ninth distribution terminal DN9, distribute $19^{th}$ and $20^{th}$ distribution clock signals corresponding to the ninth distribution clock signal through a $10^{th}$ distribution terminal DN10, distribute $21^{st}$ and $22^{nd}$ distribution clock signals corresponding to the $10^{th}$ distribution clock signal through a 11th distribution terminal DN11, distribute $23^{rd}$ and $24^{th}$ distribution clock signals corresponding to the $11^{th}$ distribution clock signal through a $12^{th}$ distribution terminal DN12, distribute $25^{th}$ and $26^{th}$ distribution clock signals corresponding to the $12^{th}$ distribution clock signal through a $13^{th}$ distribution terminal DN13, distribute $27^{th}$ and $28^{th}$ distribution clock signals corresponding to the $13^{th}$ distribution clock signal through a $14^{th}$ distribution terminal DN14, and distribute $29^{th}$ and $30^{th}$ distribution clock signals corresponding to the $14^{th}$ distribution clock signal through a $15^{th}$ distribution terminal DN15. For example, the fourth stage $14^{th}$ stage may include an eighth inverter coupled between the fourth distribution terminal DN4 and the eighth distribution terminal DN8, a ninth inverter coupled between the fourth distribution terminal DN4 and the ninth distribution terminal DN9, a $10^{th}$ inverter coupled between the fifth distribution terminal DN5 and the $10^{th}$ distribution terminal DN10, an $11^{th}$ inverter coupled between the fifth distribution terminal DN5 and the $11^{th}$ distribution terminal DN11, a $12^{th}$ inverter coupled between the sixth distribution terminal DN6 and the $12^{th}$ distribution terminal DN12, a $13^{th}$ inverter coupled between the sixth distribution terminal DN6 and the $13^{th}$ distribution terminal DN13, a $14^{th}$ inverter coupled between the seventh distribution terminal DN7 and the $14^{th}$ distribution terminal DN14, and a 15th inverter coupled between the seventh distribution terminal DN7 and the 15th distribution terminal DN15.

The fifth stage 5th stage may generate first to 16th dock signals Vmixa0<0:15> corresponding to the 15th to 30th distribution dock signals. The first to $16^{th}$ dock signals Vmixa0<0:15> may be included in the plurality of first clock signals Vmixa0<0:K>. For example, the fifth stage $5^{th}$ stage may serve as an output driver. In an embodiment, each of the first to fifth stages $1^{st}$ stage to stage includes one inverter or two inverters for each distributed path, i.e., a branch. However, the present disclosure is not necessarily limited thereto, and each of the first to fifth stages $1^{st}$ stage to $5^{th}$ stage may include two or more inverters or three or more inverters depending on design. For example, the two or more inverters may be coupled in series, and the three or more inverters may be coupled in series. In addition, the number of paths distributed from each of the first to fifth stages $1^{st}$ stage to $5^{th}$ stage may be variously changed depending on design.

Hereinafter, an operation of the image sensor 100 in accordance with an embodiment, which has the above-described configuration, is described.

The image sensor 100 may generate the depth map information indicating the depth from the subject 200 by using the TOF method. For example, the image sensor 100 may generate or calculate the depth map information by detecting the phase difference between the emitted light MS that is emitted to the subject 200 and the incident light RS that is reflected from the subject 200.

The image sensor 100 may generate and use the plurality of first output dock signals Vmixa<0:X> and the plurality of second output clock signals Vmixb<0:X> when generating the depth map information. In order to minimize a peak current when generating the plurality of first output clock signals Vmixa<0:X> and the plurality of second output clock signals Vmixb<0:X>, the image sensor 100 may not generate the plurality of first output clock signals Vmixa<0:X> at the same time, and may not generate the plurality of second output clock signals Vmixb<0:X> at the same time. For example, the first clock chain 143 may generate the plurality of first delayed clock signals Vmixap<0:M>, thereby preventing the peak current generated by the first demodulation driver 145, and the second clock chain 147 may generate the plurality of second delayed clock signals Vmixbp<0:M>, thereby preventing the peak current generated by the second demodulation driver 149.

Figure 7:
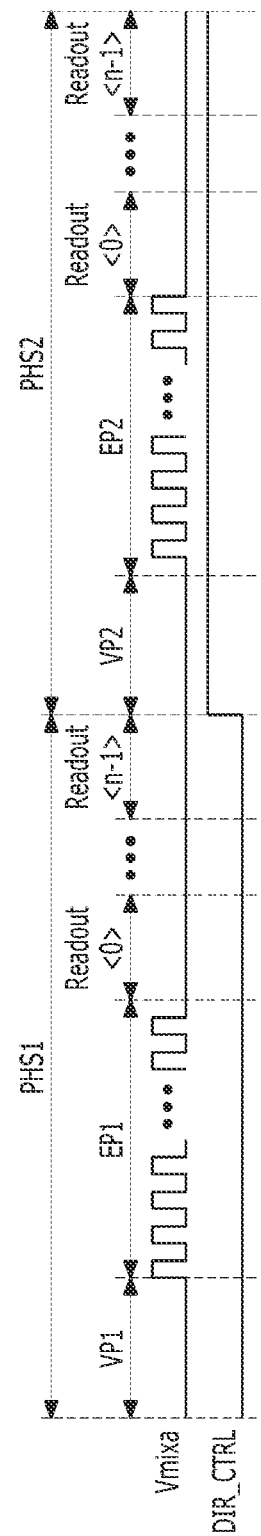
FIGS. 7 to 9 are diagrams illustrating an operation of the first clock chain illustrated in FIG. 3 in accordance with an embodiment of the present disclosure.

FIG. 7 is a timing diagram illustrating an operation of the first clock chain 143 in accordance with an embodiment of the present disclosure.

Referring to FIG. 7, the first phase PHS1 of a unit frame period may include a first blank period VP1, the first exposure period EP1, and first readout periods Readout<0:n−1>, The first input clock signal Vmixa may be generated during the first exposure period EP1 of the first phase PHS1, During the first exposure period EP1, the first clock chain 143 may sequentially generate the plurality of first delayed clock signals Vmixap<0:M> from the first one Vmixap<0> to the last one Vmixap<M> of the first delayed clock signals Vmixap<0:M> along the forward path, on the basis of the first input clock signal Vmixa and the control signal DIR_CTRL. In this case, the control signal DIR_CTRL may have a first logic level, that is, "0", during the first exposure period EP1. The first clock chain 143 may operate as a forward clock chain during the first phase PHS1, The first clock chain 143 may continuously maintain the forward path without switching over to the backward path during the first phase PHS1.

Figure 8:
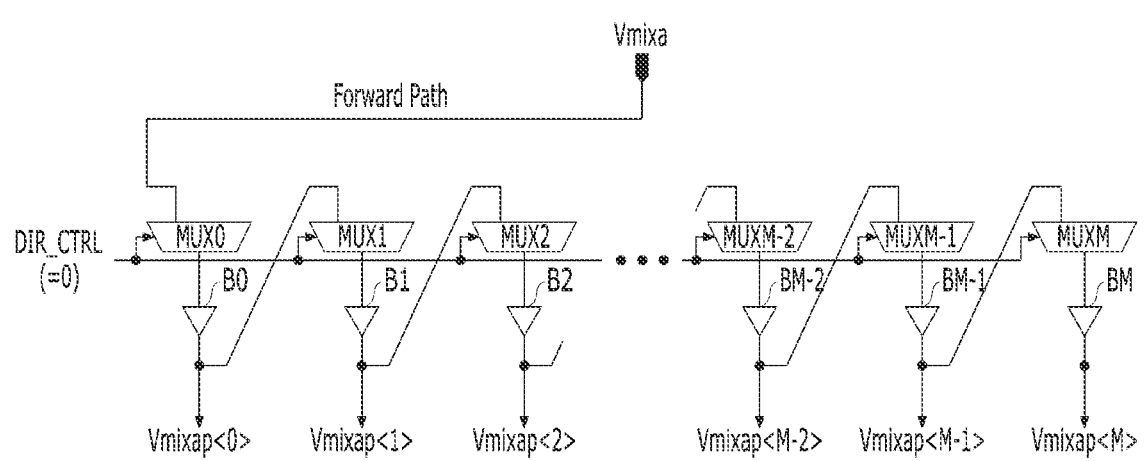

FIG. 8 is a diagram illustrating a case where the first clock chain 143 operates as the forward clock chain in accordance with an embodiment of the present disclosure.

Referring to FIG. 8, the plurality of selection circuits MUX0 to MUXM may select the first input clock signal Vmixa and the first delayed clock signals Vmixap<0:11-1>, respectively, according to the control signal DIR_CTRL having the first logic level, that is, "0". Accordingly, the plurality of buffer circuits B0 to BM may sequentially generate the plurality of first delayed clock signals Vmixap<0:M> from the last one Vmixap<M> to the first one Vmixap<0> of the first delayed clock signals Vmixap<0:M> along the forward path.

Referring back to FIG. 7, the second phase PHS2 of the unit frame period may include a second blank period VP2, the second exposure period EP2, and second readout periods Readout<0:n−1>. The first input clock signal Vmixa may be generated during the second exposure period EP2 of the second phase PHS2. During the second exposure period EP2, the first clock chain 143 may sequentially generate the plurality of first delayed clock signals Vmixap<0:11> from the last one Vmixap M> to the first one Vmixap<0> of the first delayed clock signals Vmixap<0:M> along the backward path, on the basis of the first input clock signal Vmixa and the control signal DIR_CTRL. In this case, the control signal DIR_CTRL may have a second logic level, that is, "1", different from the first logic level, during the second exposure period EP2. The first clock chain 143 may operate as a backward clock chain during the second phase PHS2, The first clock chain 143 may continuously maintain the backward path without switching over to the forward path during the second phase PHS2.

Figure 9:
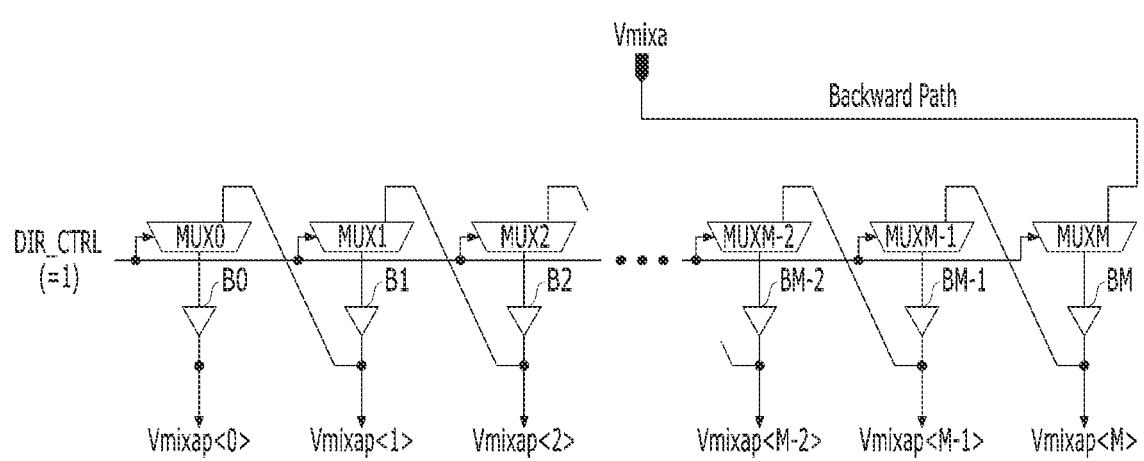

FIG. 9 is a diagram illustrating a case where the first clock chain 143 operates as the backward clock chain in accordance with an embodiment of the present disclosure.

Referring to FIG. 9, the plurality of selection circuits MUX0 to MUXM may select the first input clock signal Vmixa and the respective first delayed clock signals Vmixap<1:M> according to the control signal DIR_CTRL having the second logic level, that is, "1". Accordingly, the plurality of buffer circuits B0 to BM may sequentially generate the plurality of first delayed clock signals Vmixap<0; from the last one Vmixap<M> to the first one Vmixap<0> of the first delayed dock signals Vmixap<0:M> along the backward path.

According to an embodiment of the present disclosure, a forward path and a backward path of a dock chain share the same circuits, for example, a plurality of selection circuits and a plurality of buffer circuits, which makes it possible to equalize a routing distance between the forward path and the backward path. In addition, a forward clock chain and a backward dock chain operate independently for each phase, which makes it possible to minimize an error that may occur in operation while minimizing a circuit required when switching over to the forward clock chain or the backward clock chain.

According to an embodiment of the present disclosure, a forward path and a backward path of a clock chain have physically the same routing distance, which makes it possible to prevent a timing skew between the forward path and the backward path.

In addition, according to an embodiment of the present disclosure, when clock signals used for measuring a depth are generated, the forward clock chain and the backward clock chain operate independently for each phase, which makes it possible to prevent noise, for example, depth fixed pattern noise, occurring in a depth map.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensor comprising:
a plurality of selection circuits each suitable for receiving two clock signals among an input clock signal and a plurality of delayed clock signals, and outputting, as each of a plurality of selection clock signals, one selection clock signal between the two clock signals on the basis of a control signal; and
a plurality of buffer circuits suitable for generating the plurality of delayed clock signals on the basis of the plurality of selection clock signals outputted from the plurality of selection circuits,
wherein at least one of the plurality of selection circuits receives two clock signals among the plurality of delayed clock signals.

2. The image sensor of claim 1, wherein the plurality of selection circuits include:
a first selection circuit suitable for receiving the input clock signal and a second delayed clock signal among the plurality of delayed clock signals, and outputting, as a first selection clock signal among the plurality of selection clock signals, one of the input clock signal and the second delayed clock signal on the basis of the control signal;
a second selection circuit suitable for receiving first and third delayed clock signals among the plurality of delayed clock signals, and
outputting, as a second selection clock signal among the plurality of selection clock signals, one of the first and third delayed clock signals on the basis of the control signal; and
a third selection circuit suitable for receiving the second delayed clock signal and the input clock signal, and outputting, as a third selection clock signal among the plurality of selection clock signals, one of the second delayed clock signal and the input clock signal on the basis of the control signal.

3. The image sensor of claim 1, wherein the plurality of buffer circuits include:
a first buffer circuit suitable for delaying, by a predetermined delay time, a first selection clock signal among the plurality of selection clock signals to generate a first delayed clock signal among the plurality of delayed clock signals;
a second buffer circuit suitable for delaying, by the delay time, a second selection clock signal among the plurality of selection clock signals to generate a second delayed clock signal among the plurality of delayed clock signals; and
a third buffer circuit suitable for delaying, by the delay time, a third selection clock signal among the plurality of selection clock signals to generate a third delayed clock signal among the plurality of delayed clock signals.

4. The image sensor of claim 1, wherein the plurality of buffer circuits sequentially generate the plurality of delayed clock signals from a first one to a last one of the delayed clock signals during a first exposure period included in a first phase, and sequentially generate the plurality of delayed clock signals from the last one to the first one of the delayed clock signals during a second exposure period included in a second phase.

5. The image sensor of claim 1, further comprising:
a demodulation driver suitable for receiving the plurality of delayed clock signals to generate a plurality of output clock signals corresponding to the plurality of delayed clock signals; and
a pixel array suitable for generating pixel signals corresponding to depth map information on the basis of the plurality of output clock signals and a light signal reflected from a subject.

6. The image sensor of claim 5, wherein the demodulation driver includes a plurality of clock trees suitable for respectively receiving the plurality of delayed clock signals, distributing the plurality of delayed clock signals, and generating the plurality of output clock signals.

7. An image sensor comprising:
a first selection circuit suitable for receiving a first input clock signal and a second delayed clock signal, and outputting, as a first selection clock signal, one of the first input clock signal and the second delayed clock signal on the basis of a control signal;
a first buffer circuit suitable for generating a first delayed clock signal on the basis of the first selection clock signal;
a second selection circuit suitable for receiving the first delayed clock signal and a third delayed clock signal, and outputting, as a second selection clock signal, one of the first delayed clock signal and the third delayed clock signal on the basis of the control signal;
a second buffer circuit suitable for generating the second delayed clock signal on the basis of the second selection clock signal;
a third selection circuit suitable for receiving the second delayed clock signal and the first input clock signal, and outputting, as a third selection clock signal, one of the second delayed clock signal and the first input clock signal on the basis of the control signal; and
a third buffer circuit suitable for generating the third delayed clock signal on the basis of the third selection clock signal.

8. The image sensor of claim 7, wherein the first to third buffer circuits sequentially generate the first to third delayed clock signals from the first delayed clock signal to the third delayed clock signals during a first exposure period included in a first phase, and sequentially generate the first to third delayed clock signals from the third delayed clock signal to the first delayed clock signal during a second exposure period included in a second phase.

9. The image sensor of claim 7, further comprising:
a fourth selection circuit suitable for receiving a second input clock signal having a different phase from the first input clock signal and a fifth delayed clock signal, and outputting, as a fourth selection clock signal, one of the second input clock signal and the fifth delayed clock signal on the basis of the control signal;
a fourth buffer circuit suitable for generating a fourth delayed clock signal on the basis of the fourth selection clock signal;
a fifth selection circuit suitable for receiving the fourth delayed clock signal and a sixth delayed clock signal, and outputting, as a fifth selection clock signal, one of the fourth delayed clock signal and the sixth delayed clock signal on the basis of the control signal;
a fifth buffer circuit suitable for generating the fifth delayed clock signal on the basis of the fifth selection clock signal;
a sixth selection circuit suitable for receiving the fifth delayed clock signal and the second input clock signal, and outputting, as a sixth selection clock signal, one of the fifth delayed clock signal and the second input clock signal on the basis of the control signal; and a sixth buffer circuit suitable for generating the sixth delayed clock signal on the basis of the sixth selection clock signal.

10. The image sensor of claim 9, wherein the fourth to sixth buffer circuits sequentially generate the fourth to sixth delayed clock signals from the fourth delayed clock signal to the sixth delayed clock signals during a first exposure period included in a first phase, and sequentially generate the fourth to sixth delayed clock signals from the sixth delayed clock signal to the fourth delayed clock signal during a second exposure period included in a second phase.

11. The image sensor of claim 9, further comprising:
a first demodulation driver suitable for receiving the first to third delayed clock signals, generating a plurality of first output clock signals corresponding to the first delayed clock signal, generating a plurality of second output clock signals corresponding to the second delayed clock signal, and generating a plurality of third output clock signals corresponding to the third delayed clock signal;
a second demodulation driver suitable for receiving the fourth to sixth delayed clock signals, generating a plurality of fourth output clock signals corresponding to the fourth delayed clock signal,
generating a plurality of fifth output clock signals corresponding to the fifth delayed clock signal, and generating a plurality of sixth output clock signals corresponding to the sixth delayed clock signal; and
a pixel array suitable for generating pixel signals corresponding to depth map information on the basis of the plurality of first to sixth output clock signals and a light signal reflected from a subject.

12. The image sensor of claim 11, wherein the first demodulation driver includes:
a first clock tree suitable for receiving the first delayed clock signal, distributing the first delayed clock signal to generate the plurality of first output clock signals;
a second clock tree suitable for receiving the second delayed clock signal, and distributing the second delayed clock signal to generate the plurality of second output clock signals; and
a third clock tree suitable for receiving the third delayed clock signal, and distributing the third delayed clock signal to generate the plurality of third output clock signals.

13. The image sensor of claim 11, wherein the second demodulation driver includes:
a fourth clock tree suitable for receiving the fourth delayed clock signal, and distributing the fourth delayed clock signal to generate the plurality of fourth output clock signals;
a fifth clock tree suitable for receiving the fifth delayed clock signal, and distributing the fifth delayed clock signal to generate the plurality of fifth output clock signals; and a sixth clock tree suitable for receiving the sixth delayed clock signal, and distributing the sixth delayed clock signal to generate the plurality of sixth output clock signals.

14. An operating method of an image sensor, the operating method comprising:
sequentially generating a plurality of delayed clock signals from a first one to a last one of the delayed clock signals along a forward path of a clock chain on the basis of a control signal during a first exposure period included in a first phase; and
sequentially generating the plurality of delayed clock signals from the last one to the first one of the delayed clock signals along a backward path of the clock chain on the basis of the control signal during a second exposure period included in a second phase, wherein the forward path and the backward path share the clock chain.

15. The operating method of claim 14, further comprising receiving, by a plurality of clock trees, the plurality of delayed clock signals, and distributing the respective delayed clock signals to generate a plurality of output clock signals,
wherein the plurality of output clock signals are used to generate depth map information.

16. The operating method of claim 14, wherein the generating of the delayed clock signals along the forward path includes keeping the forward path without switching over to the backward path during the first phase.

17. The operating method of claim 14, wherein the generating of the delayed clock signals along the backward path includes keeping the backward path without switching over to the forward path during the second phase.

18. An image sensor for generating depth map information according to a time of flight (TOF) scheme, the image sensor comprising:
a pixel array configured to generate, from an incident light, pixel signals for the depth information according to a group of output clock signals during first and second exposure periods; and
a controller configured to generate the group based on a forward sequence of delayed clock signals during the first exposure period and based on a backward sequence of the delayed clock signals during the second exposure period,
wherein the controller includes a chain of delay units, two at both ends of which are configured to selectively receive an input clock signal,
wherein the forward sequence and the backward sequence share the chain, and
wherein the controller is further configured to:
sequentially generate, based on the input clock signal provided through one of the ends, the forward sequence from a first one to a last one of the delayed clocks signals, and
sequentially generate, based on the input clock signal provided through the other one of the ends, the backward sequence from the last one to first one of the delayed clocks signals.

* * * * *